(12) United States Patent
Pande

(10) Patent No.: US 11,783,263 B2
(45) Date of Patent: Oct. 10, 2023

(54) INTEGRATED DISASTER RECOVERY MANAGEMENT

(71) Applicant: Rakesh Pande, Mumbai (IN)

(72) Inventor: Rakesh Pande, Mumbai (IN)

( * ) Notice: Subject to any disclaimer, the term of this patent is extended or adjusted under 35 U.S.C. 154(b) by 0 days.

(21) Appl. No.: 17/496,643

(22) Filed: Oct. 7, 2021

(65) Prior Publication Data

US 2023/0112204 A1    Apr. 13, 2023

(51) Int. Cl.
*G06Q 10/06* (2023.01)
*G06Q 10/0637* (2023.01)
*G06Q 10/067* (2023.01)

(52) U.S. Cl.
CPC ..... *G06Q 10/06375* (2013.01); *G06Q 10/067* (2013.01)

(58) Field of Classification Search
None
See application file for complete search history.

(56) References Cited

U.S. PATENT DOCUMENTS

| | | | |
|---|---|---|---|
| 6,421,571 B1* | 7/2002 | Spriggs | G05B 19/19 700/83 |
| 2009/0201800 A1* | 8/2009 | Naseh | H04L 45/22 370/221 |
| 2014/0362705 A1* | 12/2014 | Pan | H04L 47/125 370/237 |
| 2017/0061348 A1* | 3/2017 | Mack | G06Q 10/06313 |

OTHER PUBLICATIONS

Jiang et al. ("Multi-stage dynamic post-disaster recovery strategy for distribution networks considering integrated energy and transportation networks," in CSEE Journal of Power and Energy Systems, vol. 7, No. 2, pp. 408-420, Mar. 2021, doi: 10.17775/CSEEJPES.2020.02020.).*

* cited by examiner

*Primary Examiner* — Matthew D Henry
(74) *Attorney, Agent, or Firm* — Steven R. Fairchild

(57) ABSTRACT

A disaster recovery is provided. A plurality of assets is connected in a plurality of tree networks, and the plurality of tree networks are interlinked to form a master mesh network. When an asset in the master mesh network is impacted, multiple alternate paths are determined to operationalize at least some of the impacted assets.

14 Claims, 5 Drawing Sheets

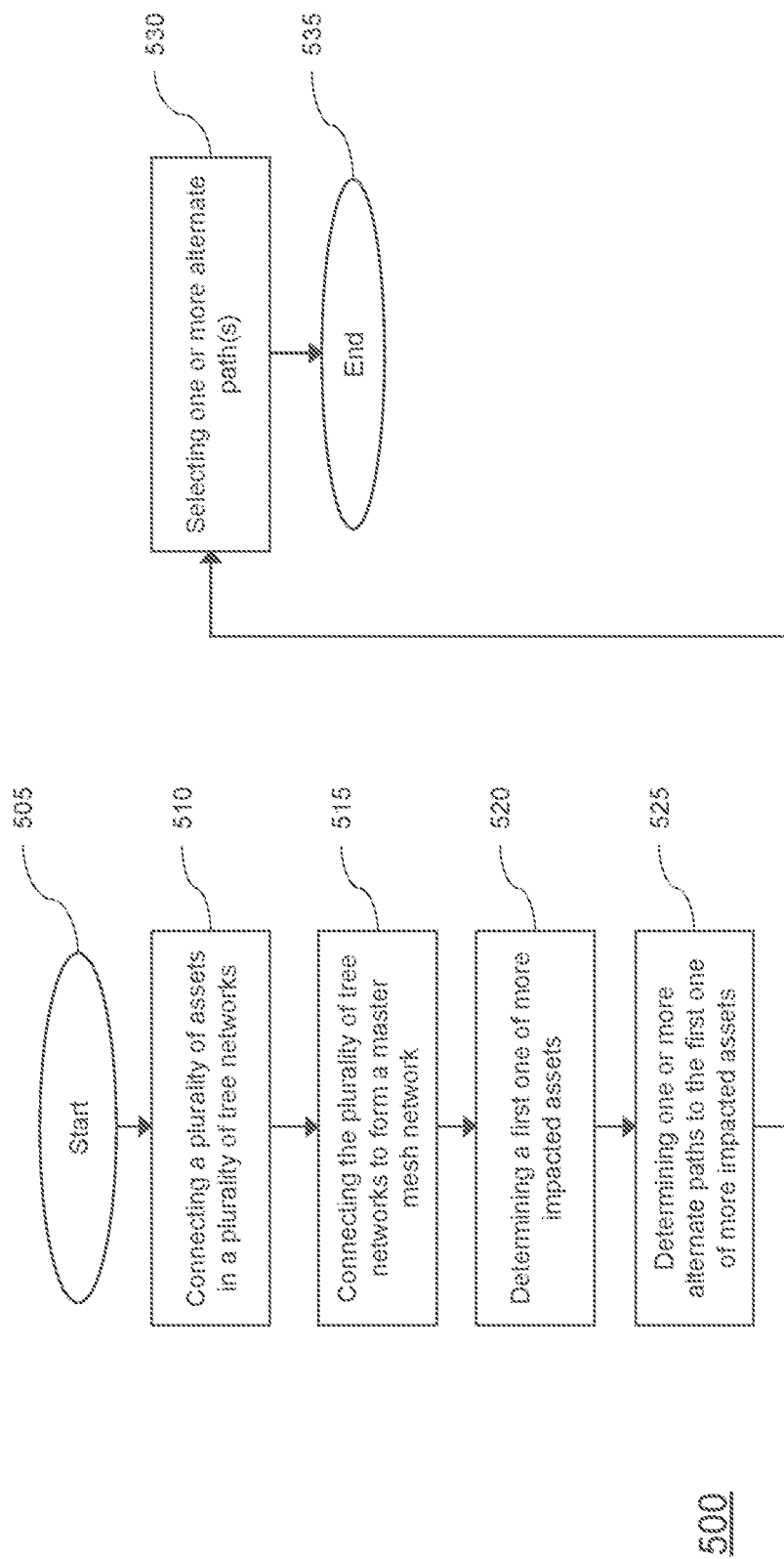

& 1,783,263 B2

INTEGRATED DISASTER RECOVERY MANAGEMENT

BACKGROUND

In an organization, each business function or a process has their separate Business Continuity Plans (BCP). These BCPs are less complex in comparison to continuity plans related to Information Technology (ITDR Plans) and hence can be read and understood by majority of Business Representatives & Business Continuity professionals. In contrast, the Information Technology team generally has only ONE ITDR Plan for the entire organization/premise/site. Further, since the ITDR plans are highly complex, these are generally prepared by respective IT professionals in silos and compiled as one document. Due to the complexity and lack of understanding by others, the ITDR plans are generally not reviewed or challenged for inaccuracies. Audit of these plans are therefore ineffective and superficial.

BRIEF DESCRIPTION OF THE DRAWINGS

The present description will be understood more fully when viewed in conjunction with the accompanying drawings of various examples of integrated disaster recovery management systems and methods. The description is not meant to limit the integrated disaster recovery management systems and methods to the specific examples. Rather, the specific examples depicted and described are provided for explanation and understanding of integrated disaster recovery management systems and methods. Throughout the description the drawings may be referred to as drawings, figures, and/or FIGS.

FIG. 5 is a flow chart illustrating a method of disaster recovery, according to an embodiment.

DETAILED DESCRIPTION

Figure 1:
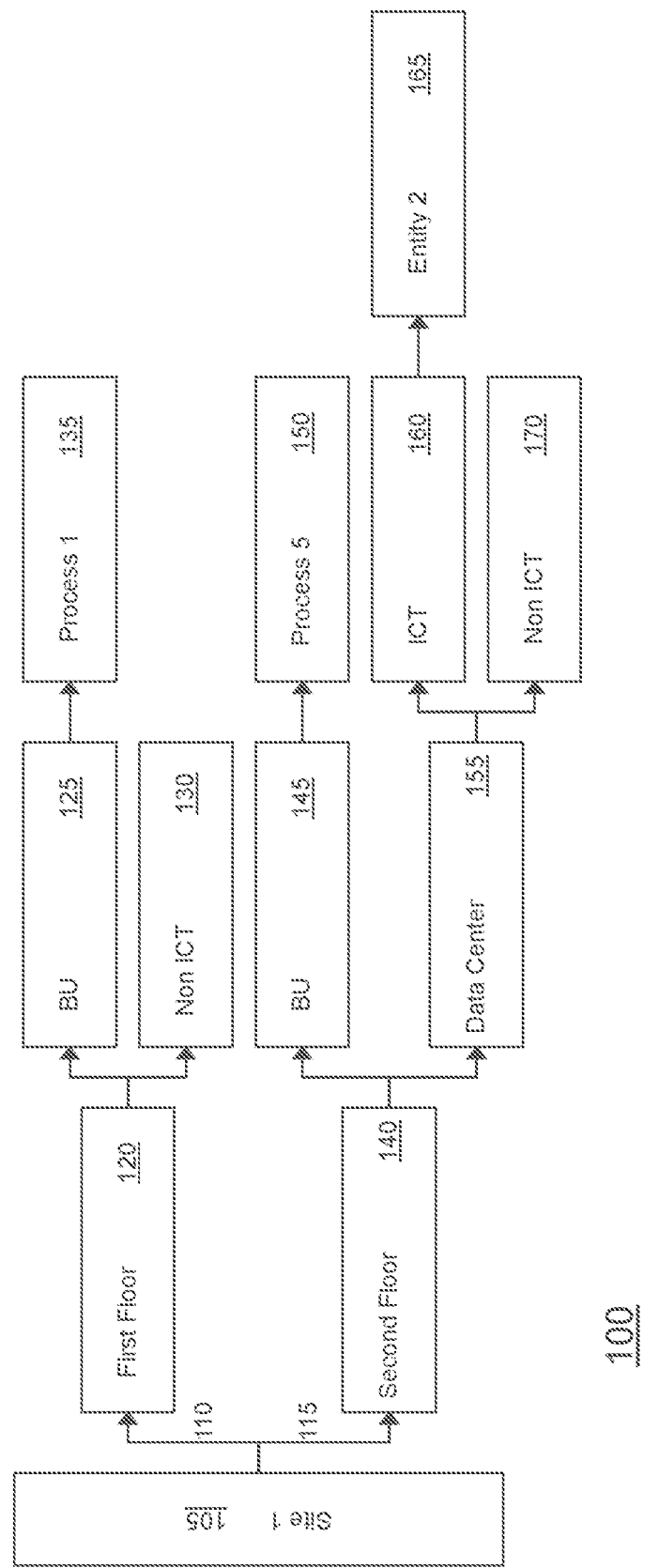
FIG. 1 shows a tree network, according to an embodiment.

Integrated disaster recovery management systems and methods as disclosed herein will become better understood through a review of the following detailed description in conjunction with the figures. The detailed description and figures provide merely examples of the various embodiments of integrated disaster recovery management systems and methods. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.]

Typically, in an organization, each business function or a process has their separate Business Continuity Plans (BCP). These BCPs are less complex in comparison to continuity plans related to Information Technology (ITDR Plans) and hence can be read and understood by majority of Business Representatives & Business Continuity professionals. In contrast, the Information Technology team generally has only ONE ITDR Plan for the entire organization/premise/site. Further, since the ITDR plans are highly complex, these are generally prepared by respective IT professionals in silos and compiled as one document. Due to the complexity and lack of understanding by others, the ITDR plans are generally not reviewed/challenged for inaccuracies. Audit of these plans are therefore ineffective and superficial.

In practice the IT Systems are highly interlinked and dependent on other IT and Non-IT sub-Systems and Components. Since the ITDR Plans are written in Silos by individual IT professionals, it suffers from lack of co-operation and co-ordination with other IT, Non-IT sub-Systems and business processes. Inter-dependencies as identified in the Business Impact Analysis (BIA) of various business processes/functions are often ignored/not taken into account in ITDR systems/processes. In the event of a failure in the current methods & systems (ITDR plans), due to above mentioned drawbacks, there is a total lack of accountability in identification of 'root causes' and 'lessons learnt'.

Instead of being 'Pro-Active', these methods & systems (current ITDR methods & systems) are 'Reactive' in nature. Typically, they are invoked by the IT Teams only when a designated entity informs or invokes a series of steps.

Even though the Business Processes/Functions bear the total cost towards present day systems & methods of ITDR, these are not 'Business Owned' and 'Business Driven'. Further, the Business has no means to control/verify its effectiveness during disasters.

There is no ITDR method or system, which presents the status (Ops Vs Non-Ops) of various IT, and especially the Non-IT systems (on which these IT Systems are dependent upon) on a real-time basis, during conduct of an exercise or an actual disaster.

Therefore, there is a need of an asset agnostic and an integrated method and system of Disaster Recovery of IT and Non-IT assets.

Creation of a tree network begins with each office, site or premise of an organization or its vendor or its cloud service provider. For the purpose of ease in understanding, all these premises, be it an Office of the Organization or a Vendor location or a Cloud location where the data/web-site is stored/hosted, are all termed as a 'Site' in the IDR-MS". These sites/offices, shown as 'Site-1' in FIG. 1, therefore form the 'Root' of the tree network 100. Authorized personnel, who have been granted access rights to undertake this task, then add 'Child Assets' (Container or Non-Container) to this 'Root', one after another, to form a tree. For example, 1st Floor and 2nd Floor can be added as 'Child Assets'. The linking of a 'Child Asset' to a 'Parent Asset', is undertaken as per a pre-defined rule to make the tree formation more logical and realistic. As an example, a 'Site' (Container Asset) can have only 'Sub-Site' (example, First Floor, East Wing etc.), 'Business Unit'/'Department', 'Network', 'Data Centre', 'Non-ICT' and 'ICT' (all Container) assets as its Child Asset. No other asset (be it a Container or a Non-Container) can be a child asset to a 'Site'. Similarly, a 'Data Centre' (Container Asset) can have only Network (Container Asset), ICT (Container Asset) and Non-ICT (Container Asset) as its Child Assets, and a 'Server/SAN/NAS' (Container Asset) can have only 'Hardware', 'Software' and 'Data' (all Non-Container Assets) as its Child Assets.

In an organization, all its Information & Technology applications & systems are located within some other system, infrastructure or container, which can either be, a Non-IT Infrastructure, such as, a building/premises/Data Centre/UPS Room, or an IT Infrastructure such as Server, Network Attached Storage (NAS), Storage Area Network (SAN) etc. As a result of this reality, if a container gets impacted due to an adverse event, the resources placed therein also get adversely impacted. As an example, if an earthquake occurs, the entire Site/Office/Premise will be impacted along with all resources/assets placed therein.

The proposed Integrated Disaster Recovery—Management System (IDR-MS) has utilized this concept of one system/infrastructure being contained in another system/infrastructure. The IDR-MS terms all these individual systems/infrastructure as an 'Asset'. These assets when placed inside one another, forming a 'Tree', demonstrating the hierarchy of various assets in relation to their parent asset.

An 'Asset' therefore can be a 'Container Asset' or a 'Non-Container Asset'. A 'Container Asset' is one, which has the capability to contain other assets (be it a Container or a Non-Container asset). These 'Container Assets' can be of three types, viz., 'Physical', 'Abstract' or 'Virtual'. A 'Physical Container Asset' can be a 'Site' or 'Office' or 'Data Centre' (i.e., these exist in its physical form). Whereas, an 'Abstract Container Asset' is one, which does not exist in its' physical form, but is used as a logical grouping of assets. As an example, a 'Network' is an 'Abstract Container Asset', which has network cables, switches and routers, all together as a logical grouping of assets. A 'Virtual Container Asset' is created when a number of sites (refer FIG. 1) are joined together into a bigger tree depicting the entire Organization, with its Head Office as 'THE ROOT' (refer FIG. 2). These 'Sites' (FIG. 1) are joined through 'Virtual Container Assets' such as, 'Country' (India, USA, UK etc.) and 'Region' (Americas, Europe Middle East & Africa, Indo-Pacific etc.). A 'Virtual Container Asset' is created by the IDR-MS System, when forming and displaying the entire Organization Tree. On the other hand, a 'Non-Container' Asset is the smallest denomination of an asset, such as, Software, Hardware, Data, Critical Process/Activity and Entity. These 'Non-Container' assets cannot contain any other asset. The term 'Entity' denotes a group of IT hardware or system, which the User of IDR-MS wishes to refer it as the smallest denomination of an Asset. As an example, the User may call a 'Web Server', containing Web Application, Database, Operating System etc., as an 'Entity', in order to simplify the understanding of complex IT Sub-Systems and its groupings.

FIG. 1 shows a tree network 100 in which a parent node 105 is shown to have a first branch 120 and a second branch 140 such that each branch has a finite number of children nodes arranged in a hierarchical order. Each node is a container asset or a non-container asset. For example, a parent node 105 (site) may have two floors where a first-floor node 120 may have a BU node 125 and a Non-ICT node 130 as its child assets, and the BU node 125 further has a Process-1 node 135 as its child asset. A second-floor node 140 has a BU node 145 and a data center node 155 node as its child asset. The data center node 155 node has an ICT node 160 followed by an Entity-2 node 165, and a non-ICT node 170.

Figure 2:
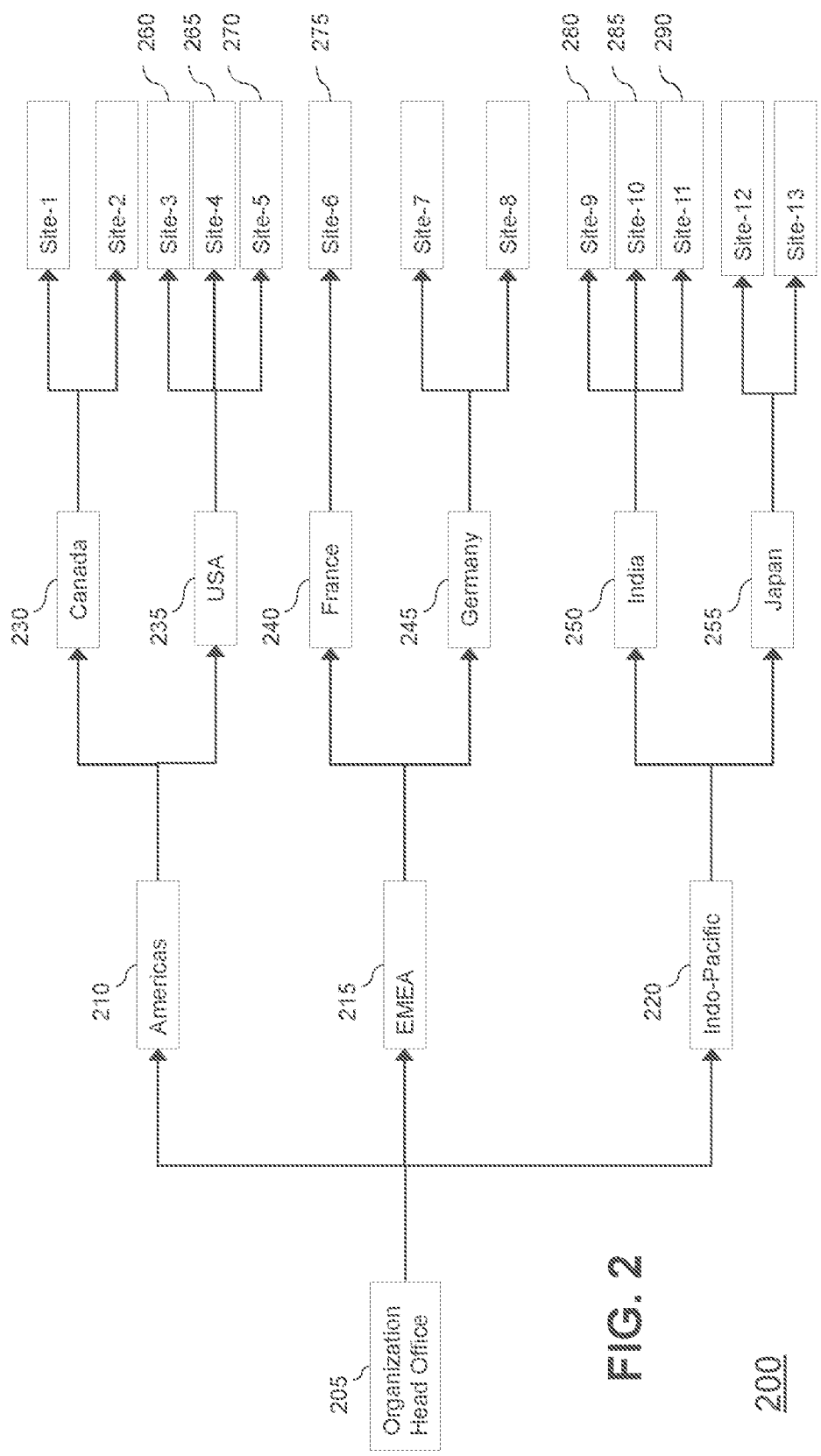
FIG. 2 shows an organization tree network, according to an embodiment.

FIG. 2 shows an organization tree network 200, having multiple interlinked individual tree networks of each site/office/premise. An organization 205 has three branches connecting the organization level node 205 to Americas 210, EMEA 215 and Indo-Pacific 220, all at global region levels namely, Americas, EMEA (Europe Middle East & Africa) and Indo-Pacific. Each global-region level node is inter-linked with respective Country level nodes. As an example, global-Region level node 210 (Americas) is linked to a Country node 230 (Canada 230) and 235 (USA 235). The interlinking of a tree networks at Site level (refer FIG. 1), into an Organization tree network 200 is undertaken through 'Virtual Containers'. This interlinking is undertaken by the IDR-MS system by first interlinking country level nodes, to be followed by Global-Region level nodes and then these Global-Region level nodes are interlinked together to form the Organization tree network 200. As an example (refer FIG. 2), all sites within USA, i.e., Site-3 260, Site-4 265 and Site-5 270, are linked to form a Country level (Virtual Container) node 235 (USA 235). Thereafter, these Country Level nodes are interlinked to form a Global-Region level node. As an example, a country level node such as Canada 230 and USA 235 are interlinked to form a Global-Region level node Americas 210. Subsequently, all Global-Region level nodes (Americas 210, EMEA 215 and Indo-Pacific 220) are interlinked to form an Organization level node 205. As a result of this interlinking through Virtual Containers, an Organization wide tree network is created (refer FIG. 2). A 'Virtual Container' is different from Physical or Abstract Containers, since it is virtually created by the IDR-MS System to display an Organization wide tree network to facilitate formation and display of Organization hierarchy and resources at various levels. As an example, all Teams at Global-Region or Country levels can be viewed through these Virtual Containers.

This Organization Tree Network 200 architecture therefore assists in appreciating the impact of a disaster. As an example, if there is a disaster at Country level, all the nodes (Container or Non-Container Assets), which fall within the hierarchy of the impacted country would be adversely impacted. Similarly, if there is a disaster at Data Centre level, all the nodes (Container or Non-Container Assets), which fall within the hierarchy of the impacted Data Centre would be adversely impacted.

Figure 3:
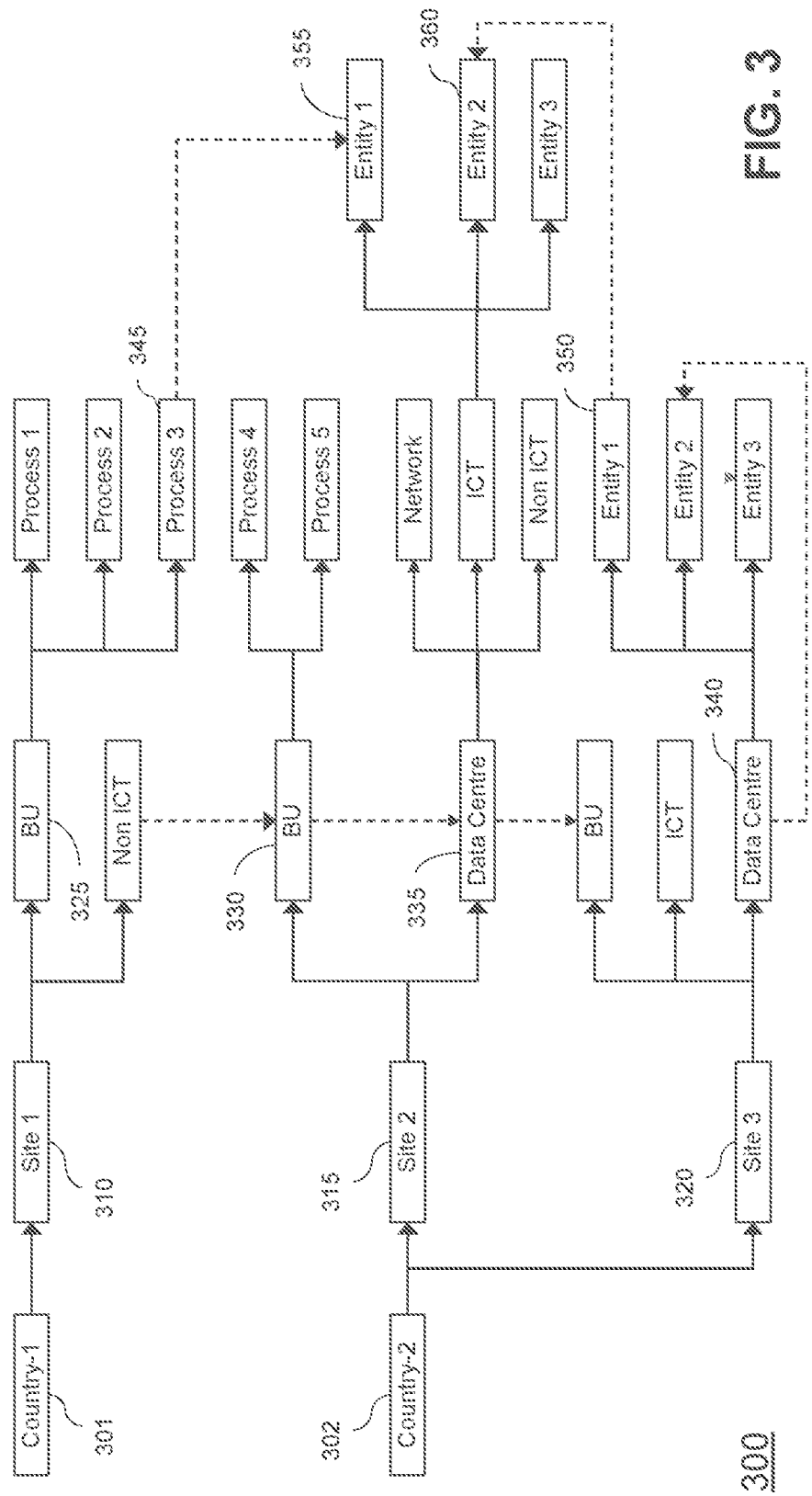
FIG. 3 shows a master mesh network, according to an embodiment.

In order to achieve true Disaster Recovery capability, this Organization Tree Network 200 referred to in FIG. 2 is enhanced through application of "Properties" and "Relationships" to assets, to form a master mesh network as shown in FIG. 3. Depending upon the type of an asset, it can have one or more properties associated with it. As an example, a site (office or premise) or a sub-site, can have only 'Primary', 'DR' and/or 'Dependent' properties attached to it. Similarly, a 'Data Center' can have only 'Main Data Center', 'Hot Site', 'Warm Site', 'Cold Site' and/or 'Single-Point-of-Failure (SPOF)' properties associated with it. Once, one or more property is associated/attached to an asset, these are inter-linked with other assets through 'Relationships'. These relationships are established as per a laid down rule. As an example, a property 'Primary' can have relationship with only 'DR' or 'Standby-Automatic' or 'Standby-Manual' properties and a property 'Main Data' can have relationship with only 'Backup Data' or 'Mirror Data' properties. An exception to this rule is, 'SPOF' property cannot be associated with any other property, since it denotes a distinct characteristic of the asset, which is, 'Single Point of Failure'.

FIG. 3 shows a master mesh network 300. Through the master mesh network 300, i.e., with the application of properties and relationships, the IDR-MS achieves a capability of proactively (or, in worst case scenario, reactively) inform/interact with other associated assets. As an example, if a fire alarm is invoked at one site (which is Non-IT Asset), the building management system of the impacted site can inform the associated surviving site (with 'DR' property) about the incident at the primary site. Similarly, if the hard disk of a Server is about to crash, the Primary Server can proactively inform the DR Server about the impending incident. Since all the assets have an accountable person attached to it, this information is conveyed by the IDR-MS instantaneously to all concerned on real time basis. As an example, the master mesh network 300, comprising of assets within two countries namely, Country-1 301 having a site 310 and Country-2 302 having sites 315 and 320. These sites have various assets within their hierarchy, demonstrating a tree architecture. However, with the application of Properties & Relationships, a mesh architecture is created. As an example, Process-3 345, which is located within BU 325, which in turn is located at Site-1 310 within Country-1 301, is dependent upon an Entity-1 355 (example, a Web Server) which is located in another country (i.e. Country-2 302) within the Site-2 315 and Data Centre 335. As a result of this mesh architecture, if the Entity-1 355 is likely to fail, the 'Internet of Thing' (IOT) devices within the system (example. The Web Server) can proactively inform accountable persons associated with Process-3 345 within BU 325 to invoke continuity plans, thereby negating or minimizing the impending impact of a failure in the Web Server (Entity-1 355). Similarly (refer FIG. 3), if the Entity-1 350 (within Site-3 320 and Data Centre 340) is impacted, it would activate Entity-2 360 (within Site-2 315 and Data Centre 335) in order to ensure minimal impact to the IT Systems.

The master tree and mesh architecture collectively achieve flow of information to all accountable/concerned individuals and assets, if and when, an asset is adversely impacted or is likely to be impacted. Further, with the help of 'Internet of Things' (IOT) devices and 'Application Programing Interface' (API) placed within various systems such as, Building Management System, Fire Control System, Servers etc., actions/steps can be initiated proactively and automatically, without any human interference. As a result, the IDR-MS provides a unique capability to an organization to effectively deal with an incident or disaster situation proactively and on real time basis.

Figure 4:
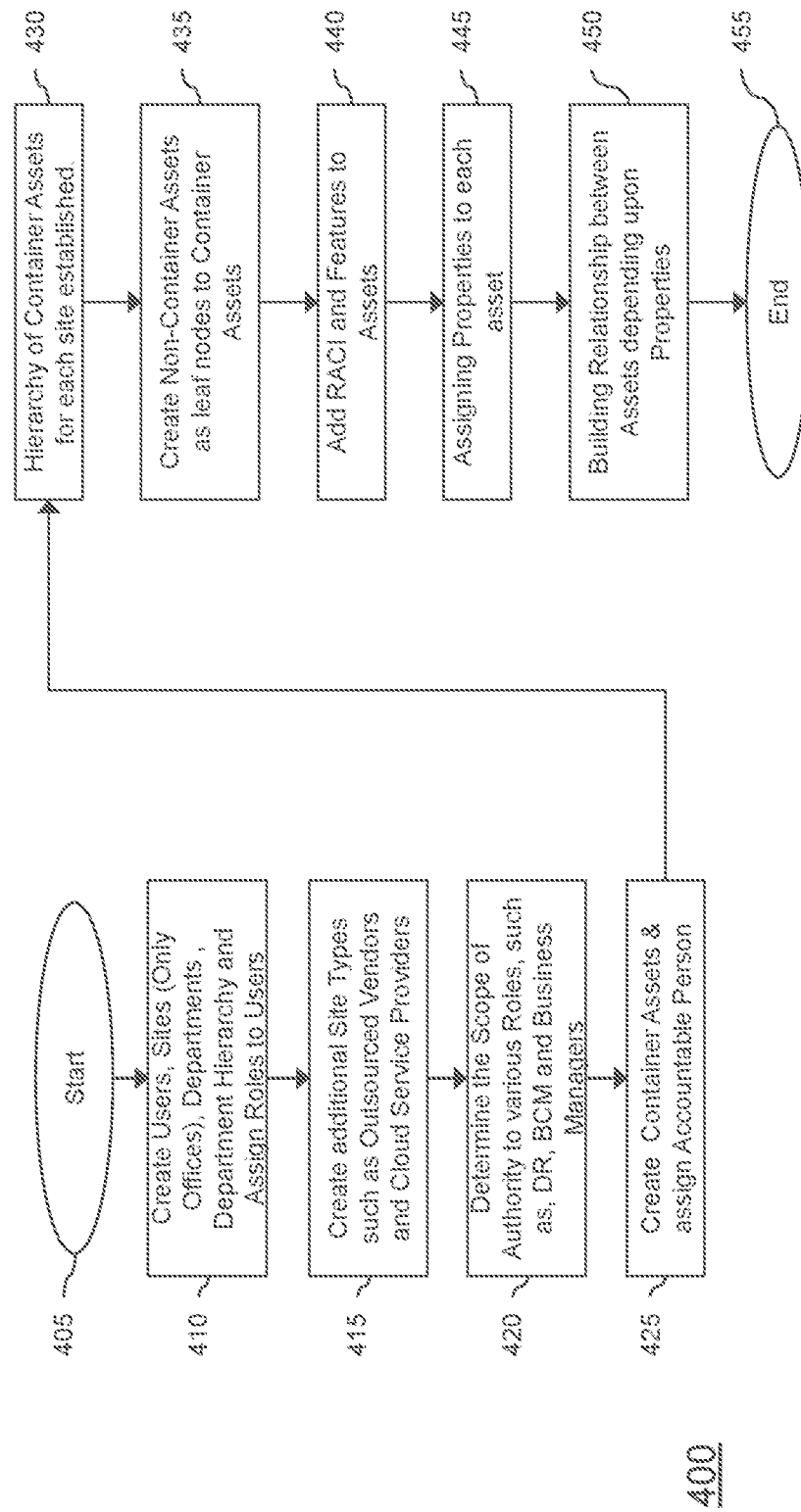
FIG. 4 is a method of creation of a master mesh network, according to an embodiment.

FIG. 4 is a method 400 of creation of master mesh network 300. Since the IDR-MS adopts a 'Role Based Access Control' (RBAC) system to restrict or grant access to predefined Users to predefined activities, at step 405, the method 400 is initiated through creation of a single User with 'HR Admin' role. The 'HR Admin', thereafter creates the Sites (Offices Only), Department, Hierarchy of Departments (Organization Chart related) and Users with assigned roles (Step 410). The HR Admin in Step 410 assigns roles such as, DR Admin, DR Manager, BCM Manager and Business Manager to Users as they are created and added to the IDR-MS. Additional sites comprising of Cloud (Service Provider) and Vendors (Service Providers) are created by DR Admin at step 415.

Subsequently, at step 420, 'Scope of Authority' is granted by DR Admin to various roles such as, DR Managers, BCM Managers, Business Managers etc. 'Scope of Authority' can be at Global, Global-Region (Indo-Pac, Europe, Asia, etc.), Country and Site levels. The 'Scope of Authority' determines the boundary (or Scope) within which an authorized user can create resources, such as assets or access a particular feature of IDR-MS. As an example, if the DR Manager has been granted the Scope of Authority at Country level, say USA, then this particular DR Manager can only create container assets within all sites (offices, vendors & cloud) which are located within USA. Similarly, if the BCM Manager is granted global (Scope of Authority), then this BCM Manager can create/modify/delete/Communicate with Teams at Global Level.

Further, at step 425, all Container Assets for an authorized site are created and accountable person for each Container Asset is assigned. A hierarchy of Container assets within each site (Office, Cloud or Vendor) is established at step 430. Creation of container assets hierarchy is undertaken by linking of a 'Child Asset' to a 'Parent Asset', as per a pre-defined rule to make the tree formation more logical and realistic. As an example, a 'Site' (Container Asset) can have only 'Sub-Site' (example, First Floor, East Wing etc.), 'Business Unit'/'Department', 'Network', 'Data Centre', 'Non-ICT' and 'ICT' (all Container) assets as its Child Asset. No other asset (be it a Container or a Non-Container) can be a child asset to a 'Site'. Similarly, a 'Data Centre' (Container Asset) can have only Network (Container Asset), ICT (Container Asset) and Non-ICT (Container Asset) as its Child Assets.

Subsequently, at step 435, Non-Container assets are added to these Container Assets by the Accountable Person of the Container Asset. In addition, an accountable person for each of these Non-Container assets is assigned. The linking of a non-container 'Child Asset' to a 'Parent Container Asset', is undertaken as per a pre-defined rule to make the tree formation more logical and realistic. As an example, a 'Server/SAN/NAS' (Container Asset) can have only 'Hardware', 'Software' and 'Data' (all Non-Container Assets) as its Child Assets. Similarly, a Business Unit/Department can have only 'Critical Process' as its child (Non-Container) asset. As result of this activity (435), the entire tree at site level is created by depicting the key IT or Non-IT Asset, as its leaf node (refer FIG. 1).

At step 440, in an embodiment of the present disclosure, Responsible, Consulted & Informed persons (RACI) for these Container and Non-Container Assets are created, clearly defining the accountability and responsibility, while indicating the people who need to be consulted and informed. In another embodiment of the present disclosure, features can be added/associated to the assets. As an example, a process document can be attached/associated with an asset to indicate the exact steps which the accountable or responsible person has to follow in the event of the asset being adversely impacted. This can break the entire DR Documentation into manageable steps. In addition, teams with members can also be associated/attached to assets along with documentation about the roles & responsibilities. These features therefore bring out the full details about the asset and it's functioning. In yet another embodiment of the present disclosure, 'Business Impact Analysis' (BIA) is added to all critical processes. BIA, for example, may include, Time Objectives such as, Recovery Time Objective (RTO), Recovery Point Objective (RPO), Maximum Acceptable Outage (MAO)/Maximum Tolerable Period of Disruption (MTPD) and Recovery Time Estimate (RTE). In addition, Sensitive Time Zones impacting Time Objectives shall also be captured. Other BIA features such as, Resources Required, Vital Records and Legal & Regulatory Requirements can also be captured.

At step 445, Properties are assigned to the assets. These Properties are assigned to an asset as per a predefined rule by the Accountable Person (refer FIG. 3). Subsequently, at step 450, Relationships are built between the assets based on the properties assigned to these assets, creating interlinkage between assets both within tree networks and across tree networks, forming a master mesh network (refer FIG. 3). As a result of the master mesh network being created of the assets, it is feasible to determine which all assets will be impacted if an Asset is met with a disaster. In addition, it may also be identified, which asset needs to provide support if the main/primary asset is impacted adversely. As an example, if a site (or Office) catches fire, its' Building Management System (BMS) through an IOT devices/API, or the Business Manager (in person) can trigger a predefined action to the IDR-MS about the incident. The IDR-MS can then send a message to all the assets (Accountable, Responsible, Consulted & Informed Category of personnel along with associated teams) in the hierarchy. In addition, all those assets with associated relationship (their Responsible, Accountable, Consulted and Informed personnel along with associated Teams) on a different site (probably, in a different country) can also be informed to take necessary disaster recovery steps. In case of the incident being triggered proactively (say, a Web Server is about to crash due to disk full limitation), the IDR-MS will be able to inform all associated assets to take preventive steps in a timely manner. The method 400 ends at step 455.

FIG. 5 is a flow chart 500 illustrating a method of disaster recovery, which can be operated in two modes, namely, "Exercise Mode" or the (actual) "Disaster Mode". The method starts at step 505. A plurality of assets (ICT asset or a non-ICT asset) is connected in a plurality of tree networks at step 510. An asset can be a container asset or a non-container asset. A container asset may be a physical asset that is physical in nature such as a site, a sub-site, a data center, a server, a Network Attached Storage (NAS) and a Storage Area Network (SAN) box, and so forth, or an abstract asset that is non-physical in nature such as a department, a business unit, a network, an ICT asset, a non-ICT asset, a cloud, a vendor, an external organization, and so forth. For example, a container asset can be the first floor of an office which can be a sub-site (physical asset of container type). A non-container asset is the lowest denomination of an asset such as a critical activity or process, a hardware, a software, data, an entity, and so forth. The term 'Entity' refers to an asset, which the User prefers to refer as one unit, despite the same comprising of various sub-components (smaller assets). As an example, the User of IDR-MS may term a PC, Server, Switch, Router etc., as an entity, despite these containing sub-assemblies of hardware & software (Container & Non-Container assets). Similarly, a cooling unit in a building, can be a non-container asset and termed as an 'Entity'. A non-container asset will always be a leaf-node of a tree network. Each tree network of the plurality of tree networks has a root, a stem, branches and leaves. The leaves are network nodes and each network node is associated with exactly one parent asset. Multiple assets are connected in each of the tree network.

The assets can be connected to a tree network either directly or manually. For example, a fire sensor can be directly connected to a tree network through an Application Programming Interface (API) over an internet connection. Similarly, all physical 'Internet of Things' (IOT) devices can be integrated/connected with the tree network over the internet on real time basis. In another example, operational availability of Electric Switch may be manually integrated into a tree network through a User Interface (UI).

Each asset has one or more properties. These properties have relationship with other assets having associated properties. The relationship-type between two assets having associated properties can be either 'One to One' or 'One to Many'. As an example, a Server having property as 'Primary' can have relationship-type 'One to One' with a 'DR' Server. However, if there are more than one 'DR' server, then the relationship-type would be 'One to Many'. Now the plurality of tree networks, each having multiple assets in a tree architecture, are formed.

At step 515, the plurality of tree networks are connected to form a master mesh network. The master mesh network connects assets belonging to multiple tree networks based on one or more properties of each of the plurality of assets. As an example, a Server located in a Data Centre (within One Tree) may have its DR Server located in another Data Centre (on another tree in a different country/site/premise). Similarly, a primary data on one tree may have mirrored/ 'Redundant Array of Inexpensive/Independent Disks' (RAID) relationship with backup data storage facility on more than one location (more nodes on different trees). As a result, a mesh network of assets would be established/ created.

At step 520, a first one of more impacted assets are determined when a first asset of the first tree network becomes non-operational. This intimation can be received by the IDR-MS through an input received from an IOT Device or an API or the User Interface of Authorized personnel, i.e., personnel with roles who can declare a disaster or show the asset as impacted. For example, if an asset at a stem node become non-operational all corresponding branch nodes and leaf nodes in a tree network will be impacted and non-operational. At this stage, the disaster timer clock will start to indicate the down time of all impacted assets, being shown as Non-Ops through the User Interface of IDR-MS.

Subsequently, at step 525, one or more alternate paths to the first one or more impacted assets is determined. The alternate paths can be through the master mesh network. For example, alternate path to a first branch of a first tree network may be through a second branch of a second tree. One or more alternate path(s) is selected at step 530 based on predefined criteria, leading to operationalize of business through the alternate operational assets. The most suitable alternate path(s) is selected based upon the Business Continuity (BC) Strategy of the Business Unit. As an example, the BC Strategy of a Business Unit may stipulate, multiple alternate paths such as, 100 personnel will work from Site A, and 150 personnel will work from Site B and the remaining 200 people will work from home. In this situation, there will be three alternate paths for the Business Unit to follow in the event of a disaster. In another example, if the BC Strategy of the Business Unit requires the business unit teams to proceed to Site X (i.e. Only One alternate path), located in a particular city, then the business teams will move to the alternate site (i.e. Site X) and commence their operations. Once the business teams are able to work from the alternate site(s) (as per their BC Strategy), they would mark their DR Site as Operational. The Exercise or actual Disaster mode would end here and at this stage, the Disaster Timer Clock would also stop. A comparative study of total down-time against Time Objectives as established through BIA features of Business Processes would be available for review/analysis. The method ends at step 535.

The key advantage of displaying Ops Vs Non-Ops status of various nodes would provide the management (of the Organization, including Business, Non-IT and IT personnel) to view which all assets are Non-Ops at a given point in time. As the repair/restoration work proceeds, these assets would attain the Ops Status, which again, would be displayed to all stakeholders on a real time basis. As a result of this display, the status of all IT & Non-IT assets would be known to all stakeholders, during an exercise or an actual disaster.

The embodiments described in this document fail to limit the scope of the disclosure, but rather provide examples to help understand what is disclosed. What is described in this document may be embodied in forms that are different from then the embodiments disclosed without departing from the scope and spirit of the disclosure.

Accordingly, it is to be understood that the above description is intended to be illustrative and not restrictive. Many embodiments and applications other than the examples provided would be apparent upon reading the above description. The scope should not be determined with reference to the above description, but rather should instead be determined with reference to the appended claims along with the full scope of equivalents to which such claims are entitled. It is anticipated and expected that future developments will occur in the technologies discussed, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made in this document. The use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the disclosure. It is submitted with the understanding that it fails to impact or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of the disclosed embodiments. The following claims are hereby incorporated into the Detailed Description, with each claim standing on its own as a separately claimed subject matter.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

What is claimed is:

1. A method for integrated disaster recovery management, the method comprising:

logically connecting a plurality of assets in a plurality of tree networks via an Application Programming Interface (API) over an internet connection, a plurality of assets are connected in a plurality of tree networks as per a pre-defined rule to make the tree formation more logical and realistic, where each of the plurality of assets has one or more properties, where each of the plurality of tree networks is in a tree architecture with assets are at nodes in the plurality of tree networks connected via physical 'Internet of Things' (IOT) devices over the internet connection on real time basis;

connecting the plurality of tree networks in a master mesh network based on one or more properties and their relationships of each of the plurality of assets, a primary data on one of the plurality of tree is stored in a backup data storage facility on more than one location using a mirrored, Redundant Array of Inexpensive or Independent Disks (RAID) technique to create the master mesh network of assets;

determining a first one of more impacted assets in a first tree network of the plurality of tree networks when a first asset of the first tree network becomes non-operational through an input received from the physical 'Internet of Things' (IOT) devices or Application Programming Interface (API) of an authorized personnel declaring a disaster or show the assets as impacted, further a disaster timer clock starts to indicate the down time of the impacted assets via the Application Programming Interface (API) and the physical 'Internet of Things' (IOT) devices are configured to trigger a pre-defined action and send a message to the plurality of assets to take preventive steps in a timely manner;

determining one or more alternate paths to the first one or more impacted assets through the plurality of assets in the master mesh network; and selecting an alternate path to the first one of more impacted assets to operationalize one or more of the first one of more impacted assets, where the alternate path is selected based on predefined criteria.

2. The method of claim 1, wherein the plurality of assets comprise RACI (Responsible, Accountable, Consulted and Informed) personnel.

3. The method of claim 2, further comprising informing the RACI personnel associated with the first impacted asset via triggering the predefined action and sending the message through the physical 'Internet of Things' (IOT) devices when the first asset becomes non-operational.

4. The method of claim 2, further comprising informing the RACI personnel associated with the first one of more impacted assets via triggering the predefined action and sending the message through the physical 'Internet of Things' (IOT) devices when the first asset becomes non-operational.

5. The method of claim 1, where the plurality of assets is directly connected to the plurality of tree networks or manually connected to the plurality of tree networks.

6. The method of claim 1, where an asset is one of a container asset and a non-container asset.

7. The method of claim 6, where the container asset is one of a physical asset and an abstract asset.

8. The method of claim 7, where the physical asset is one of a site, a sub-site, a data center, a server, a Network Attached Storage (NAS) and a Storage Area Network (SAN) box.

9. The method of claim 7, where the abstract asset is one of a department, a business unit, a network, an information and communications technology (ICT) asset, a non-ICT asset, a cloud, a vendor and an external organization.

10. The method of claim 6, where the non-container asset is one of a critical process or a critical activity associated with a hardware, a software, a data and an entity.

11. The method of claim 1, further comprising defining Time Objectives via the disaster timer clock that starts to indicate the down time of the impacted assets via the Application Programming Interface (API) and stops when the disaster ends.

12. The method of claim 1, where each asset is information and communications technology (ICT) asset or a Non-ICT asset.

13. The method of claim 1, where each property of one or more properties associated with an asset is defined a relationship-type, where the relationship-type is one of 'One to One' or 'One to Many'.

14. The method of claim 1, where the predefined criteria is based upon the approved Business Continuity Strategy of the Critical Process/Activity of the Business Unit.

\* \* \* \* \*